Jan. 23, 1934.  H. A. WADMAN  1,944,855
METHOD OF AND APPARATUS FOR MAKING GLASS
Filed July 28, 1932

Witness:
A. A. Horn

Inventor
Harold A. Wadman
by Brown & Parham
Attorneys.

Patented Jan. 23, 1934

1,944,855

UNITED STATES PATENT OFFICE 1,944,855

METHOD OF AND APPARATUS FOR MAKING GLASS

Harold A. Wadman, West Hartford, Conn., assignor to Hartford-Empire Company, Hartford, Conn., a corporation of Delaware Application July 28, 1932. Serial No. 625,241

11 Claims. (Cl. 13—6)

This invention relates to a method of and apparatus for making glass and more particularly to the use and construction of glass melting tanks in which there are at least two separate and independent sources of heat, one of which is preferably electric, the other being the usual combustion heating means.

In the past and at the present time glass making materials or batch have been and are melted in tank type furnaces in which flame is directed across the upper portion of a furnace and heat is transmitted to the batch and the glass directly from the flame by convection and by radiation from the top and side walls of the tank which are heated by the flame. Inasmuch as it is desirable in effecting the rapid conversion of the glass making materials to glass that the temperature in furnaces of this type be relatively high, it is necessary to use a flame having a high temperature. For this purpose various means including the use of regenerators and recuperators have been suggested and are now being used. It has been found, however, that the higher flame temperatures required in a furnace of this or similar type, the greater is the cost of maintaining such temperatures. In fact, the cost of maintaining high temperatures increases much faster than the increase in the temperature secured. This may be attributed not only to the high exit temperature necessary for the gases of combustion and the consequent large demands for regenerated or recuperated heat in order to produce the tempeature economically or otherwise, but also to the necessarily high grade of refractories which must be used in the furnace itself and also in the regenerator or recuperator structures used therewith. Othewise expressed, the cost of raising the temperature of the glass from 2000° F. to 2100° F. for example is much less than is the cost of raising the temperature of the same amount of glass from 2500° F. to 2600° F. At present, it appears to be more economical to raise the temperature of the glass through the lower ranges of temperature by application of combustion heat than by electrically supplied heat.

One of the objects of my present invention is, therefore, to provide a separate and independent source of heat, preferably electrical, for supplying the last increment of heat to bring the glass from a basic temperature to which the glass may economically be raised by the combustion supplied heat up to the desired high temperature.

When heat is supplied by electrical means, as for example by passing a current of electricity through the glass while using the glass itself as the resistor, the heat is generated in the glass at the point it is most needed. Also the heating of glass by electricity is substantially as economical at a high temperature range as at a low temperature as the only difference in cost depends upon the difference in specific heat of glass at the several temperatures, and the radiation loss, which are relatively minor factors. Thus it is substantially as cheap to raise a given amount of glass from 2500° F. to 2600° F. by electricity as it is to raise the same amount of glass from 2000° F to 2100° F., or even 100° in a lower temperature range. My present invention thus provides a method and apparatus usable in the melting and refining of glass in which combustion supplied heat is utilized for melting the glass making materials and raising the temperature of the glass to a given basic temperature and in which the remaining heat necessary for raising the glass to the highest desired temperature in the furnace is supplied by the use of electricity, thus effecting an economy in the melting of glass not possible in prior devices and by prior methods.

Another factor which enters the design and operation of glass melting furnaces is the variation in the "pull" on the tank, that is, variation in the amount of glass which is drawn from the tank in any given unit of time, which amount varies with changes in the rate of manufacture of glass articles and also with changes in the types of articles being made. Variation in the pull on the tank is of relatively less importance in manufacturing sheet glass wherein a given furnace is normally employed with a fairly constant pull, but becomes more important in manufacturing articles such as bottles, especially where the plant in which the furnace is installed caters to a trade requiring different shapes, sizes and weights of articles in relatively small amounts for any given type, size or weight. For example, a given tank may be called upon to deliver glass at rates ranging between 50 and 100 tons per day. From the point of view of fuel economy when considering the present commercial type of tank where all of the heat is supplied by the combustion of some fuel, it has been found that a tank is most efficient when operating at its maximum rate and that the efficiency falls materially when the pull on the tank is reduced from its normal rating or maximum capacity. It has been found that the means and structures necessarily used incident to the supplying of heat by combustion are usually designed to be most efficient at a given rate of heat supply and that when this rate of heat supply is changed the efficiency will drop. In view of this fact, glass tanks are often used at efficiencies much less than that desired, due to variations in the pull on the tank incident to the necessity for manufacturing particular types of articles which may require less glass than other types which sometimes must be manufactured.

A further object of this invention, therefore, is to provide a method of and apparatus for making glass in which combustion heating means are employed always at a given unchanging rate of heat supply, and any variations in the heat required, due to variations in the pull on the tank, are compensated for by independently supplied heat, preferably heat supplied by passing an electric current through the glass at a desired point or points in the tank between spaced electrodes. In this way it is possible to design combustion heating means, operative always at their maximum efficiency, and to take care of variations with electric current supply, which has a greater degree of flexibility and is always effective at substantially the same efficiency.

A further object of my invention is to provide in a glass melting tank normally heated by combustion heating means, a means for creating selected and controlled convection currents for assisting in the refining and homogenizing of the glass at a desired point. This may be, and in the illustrated and described embodiments of the invention is, accomplished by passing electric current through a desired portion or zone of the glass in the tank, thus creating at or adjacent to that zone upwardly moving convection currents of glass which will create a circulation of glass tending to the elimination of bubbles, seeds or contained gases and to the homogenizing of the glass being produced.

Other and more specific objects of the invention including details of construction and operation of tanks embodying my invention will be more fully set forth in and appreciated from a reading of the following specification and appended claims, when considered in conjunction with the accompanying drawing, in which:

Figure 1:
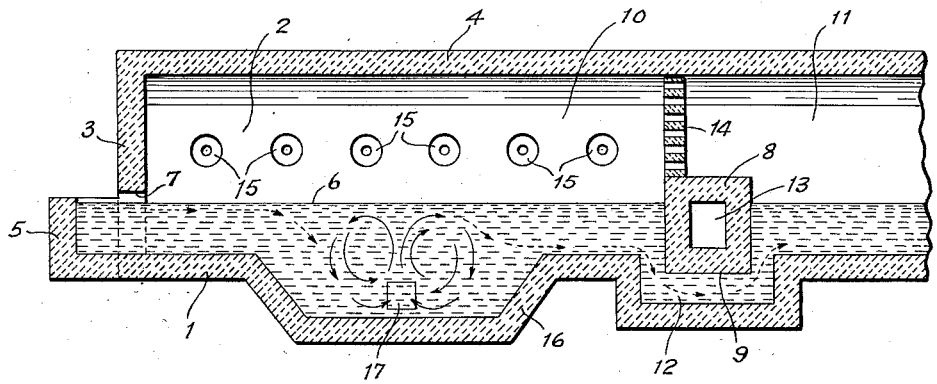
Figure 1 is a view in vertical section of a portion of a glass melting tank embodying my invention, certain parts being shown diagrammatically and others omitted.

Referring to Fig. 1 of the drawing, I have chosen to illustrate my invention as applied to a glass melting tank including a bottom 1, side walls 2, end wall 3, and an arched roof 4. This tank is provided with a usual "dog house" or extension 5 for providing a charge supplying opening, the dog house 5 being formed as the continuation of the bottom 1 and including side walls rising slightly higher than the normal level 6 of the glass in the tank. The end wall 3 terminates a short distance above the normal level 6 of the glass in the tank to permit the feeding in of glass-making materials or batch, as illustrated at 7. The tank may be divided into two chambers by a transverse baffle or bridge wall, generally indicated at 8, this baffle extending from a level somewhat above the normal level 6 of the glass in the tank to a level preferably at or beneath the floor of the tank as illustrated at 9. Communicating between the chambers 10 and 11 into which the tank is divided by the baffle 8 is a passage 12 for glass, this passage preferably being at or below the normal level of the floor of the tank, but not necessarily below such level. The path of glass therethrough is illustrated by the dotted arrows. The baffle 8 is hollow as shown at 13 to provide for passage therethrough of a cooling medium, such as water, air, steam, etc., by which the refractory material of which the baffle is made may be cooled and its effective life in service lengthened.

Extending between the baffle 8 and the roof arch 4 of the tank is a wall 14, which may be made of checker brick or of any suitable construction, and which preferably at least partially heat-separates the chamber 10 from the chamber 11 of the tank. If desired, the wall 14 may be omitted.

Means are provided in the chamber 10 for generating products of combustion in that chamber. As illustrated, these means include a plurality of burner openings 15 through which fluid fuel may be injected into the chamber 10 above the normal level 6 of the glass therein. Suitable air inlet ports and ports for the outlet of combustible materials may also be provided, these ports not being shown in the accompanying drawing. It will be understood, however, that any usual or desired construction may be employed in connection with the tank for saving heat by regeneration or recuperation and for supplying heat derived from combustion to the glass and to the glass-making materials or batch, that which is in part diagrammatically illustrated being but an example of combustion means which may be provided.

At approximately the center of the bottom wall 1 of the tank there is illustrated a well 16 to provide a deeper bath of glass at this point. Submerged in the glass and preferably one at each side of the tank are a pair of electrodes, one of which is illustrated at 17. It will be understood that alternating electric current is passed between the electrodes 17 transversely of the tank and through the glass for providing additional heat at this point, which heat will cause a circulation of glass due to the convection currents set up therein substantially as illustrated by the full line arrows in Fig. 1 of the drawing. This circulation of the glass will tend to refine it by assisting in the elimination of bubbles, seeds, and gases therefrom and also will assist in the homogenizing of the glass.

It is also contemplated that the heat supplied by combustion may be sufficient merely to heat the glass to a certain given temperature, for example 2300° F. and that sufficient additional heat will be supplied to the glass by passing an electric current therethrough to raise the temperature of the glass to the desired working or refining temperature, for example, 2650° F.

Another possible operation of the tank which is to be considered within the purview of my invention is that the combustion heating means will always be operated at a single uniform rate, preferably the most efficient rate for the combustion means provided and independently of any variations in the pull of glass on the tank, that is, the amount of glass drawn therefrom per unit of time. In conjunction with such a use of the combustion heating means, it is contemplated that any variations in the amount of heat necessary to take care of a greater pull on the tank than the minimum pull, which may be the maximum for which the combustion heating means would be adequate, will be supplied by passing electric current between the electrodes The glass in the chamber 11 may be further refined or planed in any suitable or desired manner and may be utilized as may be desired either for forming sheet or plate glass automatically or manually, or conducted to an automatic feeder, such as are now in common use in the glass industry to feed separated masses to the fabricating mechanism. The use of which the glass is put forms no part of the present invention and is not, therefore, illustrated in the accompanying drawing.

Figure 2:
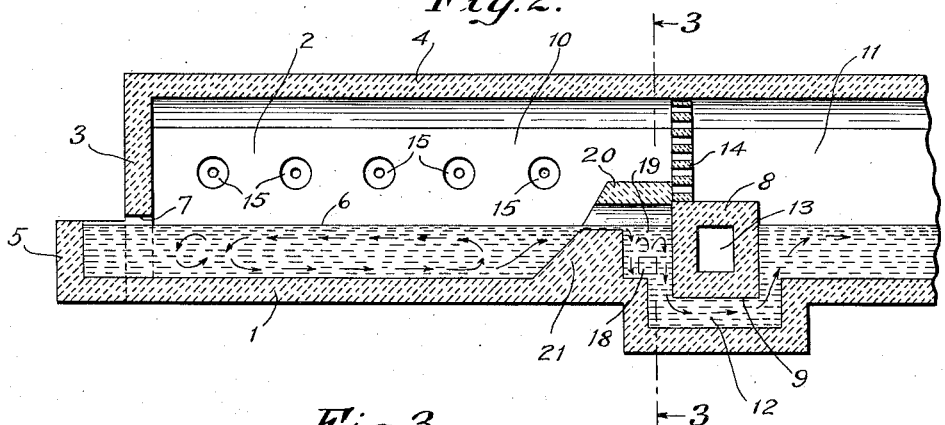
Fig. 2 is a view similar to Fig. 1 of a modified form of tank embodying my invention.
Figure 3:
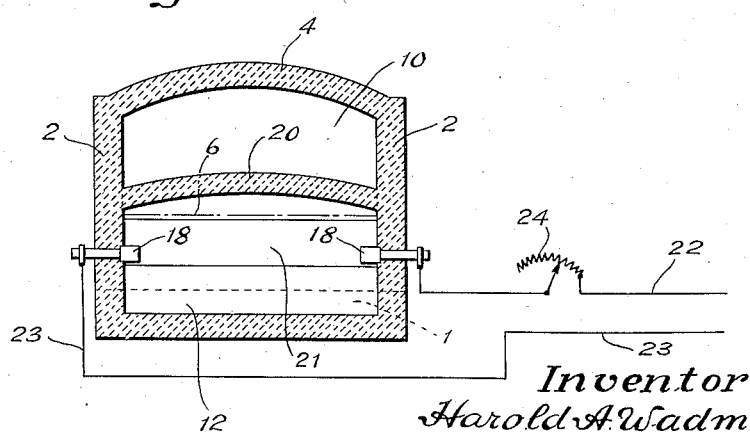
Fig. 3 is a transverse vertical section on the line 3—3 of Fig. 2.

Referring now to Figs. 2 and 3 of the drawing wherein I have shown a modified form of my invention, the same reference characters being used, as far as possible, to indicate corresponding parts. This form differs from that shown in Fig. 1 in that the recessed or well portion 16 of Fig. 1 is omitted and in that the electrodes 18 are differently located from the electrodes 17 of the form of the invention shown in Fig. 1. As illustrated in Figs. 2 and 3, the electrodes 18 are disposed one at either side of the tank adjacent to the bridge wall 8 and substantially at the entrance to the passage 12 communicating between the chambers 10 and 11. The electrodes 18 supply heat to a relatively small zone of the tank, this zone preferably being substantially separated from the other parts of the tank, although it is in the line of flow of the glass from chamber 10 to chamber 11. The purpose of this isolation of the portion of glass directly heated in a part of the tank, which may be termed a compartment and which is illustrated at 19, is to conserve as great a proportion of heat as is possible, inasmuch as it is desired that the glass adjacent to the path of the electric current be heated to the highest temperature desired in the tank. Direct radiation from the glass in this zone or compartment is prevented by a transverse arch 20 sprung between the sides of the tank and over and closely adjacent to the glass in the compartment 19. This prevents direct radiation from the zone or compartment 19 to the cooler roof and side walls of chamber 10. An upstanding baffle 21 is also provided and is preferably formed integral with the floor 1 of the tank and rises therefrom to a level just under the normal level 6 of the glass in the chamber 10. Thus, glass passing from the chamber 10 to the chamber 11 must first pass over the baffle 21, thence into the compartment 19 where it is heated by the electric current passing between the electrodes 18, and thence through the passage 12 beneath the baffle 8 to the chamber 11.

Alternating electric current may be supplied to the electrodes 18 in any suitable way, that shown in Fig. 3 being diagrammatic and conventional. As illustrated, the electrodes 18 are connected respectively to line wires 22 and 23 leading to any suitable source of single phase alternating current. Means are provided for adjustably controlling the amount of current supplied to the electrodes for controlling the rate of heat energy supply to the glass and thus controlling its temperature and the velocity of convection circulation therein caused by the electrically supplied heat. Such means in the present instance is illustrated as a rheostat 24 interposed in the power line 22, although any other means productive of the same or similar results might be substituted if desired.

Substantially the same methods of operation may be used and results obtained by the use of the structure shown in Fig. 2 as that of Fig. 1, except that in the embodiment shown in Fig. 1 the principal function of the electric energy is to control convection currents, while in the embodiment shown in Fig. 2 appreciably more energy may be added without radiation or convection loss of the energy contributed by the electric current in the high temperature zone. As illustrated by the full line arrows in Fig. 2, the current passing between the electrodes 18 will create a convection circulation and in fact a turbulence of the glass in the compartment 19 which will tend to homogenize it and assist in the elimination of contained gases, bubbles, seeds, etc. At the same time, the electric current may be used to supplement the action of the combustion heating means and to heat the glass to a higher temperature and/or may be used to compensate for variations in the pull on the tank.

I have described herein two embodiments of my invention having differently arranged pairs of electrodes for supplying heat energy to the glass by passing an electric current therethrough. It is to be considered within the purview of this invention, however, that these forms of my invention may be combined one with the other and/or either or the combination may be varied to use as many electrodes as desired for passing one or more single or plural phase currents through the glass in any desired location or locations in the furnace or tank, and in any desired direction or directions, subject only to the scope of the appended claims.

In the foregoing description and in the appended claims, I have referred to "glass" meaning thereby not "glass" in its restrictive or limiting sense, but all similar substances which may be produced by melting materials together in a melting tank of the type shown in the accompanying drawing, and wherein the same or similar problems arise as in the melting of ordinary glass. Such substances will, of course, include water glass, vitreous enamels, cements of aluminous silicates, etc. I intend, therefore, wherever the word "glass" is used in this description or in the appended claims, that this word is to be interpreted and construed in a generic sense and according to the foregoing statements rather than in any restrictive sense.

Inasmuch as changes may be made in the illustrated and described embodiments of my invention and the methods thereof may be used in whole or in part in other combinations, I do not wish to be limited except by the scope of the appended claims, which are to be construed as broadly as the state of the prior art permits.

I claim:

1. The method of making glass, which comprises supplying glass making materials to a bath of molten glass at a rate substantially equal to the rate of withdrawal of finished glass from the bath so as to maintain the contents of the bath and the level of the surface thereof substantially constant, melting said materials to form glass and refining the melted glass by applying heat of combustion to the surface of the bath to provide a basic temperature lower than the maximum desired for the glass during its transition to refined and finished glass, supplying the last increment of heat necessary to bring the molten glass up to the maximum desired temperature by impressing an alternating current of electricity upon electrodes which are always completely submerged by the molten glass, and maintaining the intensity of the electric current so supplied sufficiently low that arcing between the electrodes is positively prevented.

2. The method of operating a glass tank in the making of molten glass, which comprises feeding glass-making materials to the tank at the rate necessary to compensate for the pull of glass from the tank and thereby to maintain a predetermined quantity of glass in the tank, supplying heat generated by combustion to the tank to melt the glass-making materials to form glass, said heat supply being at a constant rate independently of variations in the pull on the tank, and supplying electrically generated heat to the glass in the tank at a variable rate to compensate for the variations in the pull on the tank and to maintain the glass at a predetermined point in the tank at a given desired temperature independently of the variations in the pull of glass from the tank.

3. Apparatus for making glass, comprising a tank for containing molten glass and glass making materials to be melted and converted into glass, combustion heating means for introducing combustible material into the tank above the normal level of the glass therein and for supplying heat of combustion to the surface of the glass in the tank and for melting the glass making materials, such combustion glass heating means being effective at substantially its maximum efficiency to melt the glass making materials and to heat the molten glass to a predetermined temperature lower than the maximum temperature desired for the glass in the tank, electric heating means including spaced, totally submerged electrodes in contact with the glass in the tank for passing an alternating current of electricity therethrough to raise the temperature of the glass in the tank to the maximum temperature desired therefor, and means to supply alternating current to said electrodes at a rate and an intensity such that arcing between the electrodes and consequent disintegration of the material of the electrodes are prevented and heat is supplied solely due to the resistance of the glass to the passage of the current, whereby the combustion heating means is utilized at its maximum economical temperature range and the electric heat is used to furnish the last increment of temperature in bringing glass to the highest temperature desired, while preventing contamination of the glass due either to disintegration of the materials of which the glass is made or due to contamination by disintegrated electrode material.

4. Apparatus for making glass, comprising a tank for containing a bath of molten glass and glass making materials to be melted and converted into glass, combustion heating means effective to operate at substantially its maximum efficiency for supplying the amount of heat necessary to melt the glass making materials and refine the glass when the tank is operated at substantially its minimum rate of production of finished glass, means including spaced electrodes wholly submerged beneath the glass of said bath for supplying alternating current electric energy to the bath of glass and thereby for generating heat therein due to the resistance of glass to the passage of the electric current for supplying such additional heat as may be necessary to compensate for variations in the pull of glass on the tank due to operations of the tank at rates greater than its minimum rate of operation, and means for supplying alternating current electric energy to said electrodes at a variable rate as desired and at an intensity such that arcing between the electrodes and consequent disintegration of the electrodes is prevented, whereby the combustion heating means is effective to supply the necessary heat for the minimum rate of tank operation and the electric heating means is operative to compensate for variations in the pull of glass on the tank above such minimum rate, and whereby the glass in the tank will not be contaminated either by products of disintegration of the glass itself due to overheating caused by arcing of an electric current therethrough or by contamination by the disintegration products of the electrodes.

5. Apparatus for making glass, comprising a tank for containing a relatively deep bath of molten glass and glass making materials to be melted and converted into glass, means for supplying combustion generated heat to the glass in said tank for melting the glass making materials therein and converting them into glass, spaced electrodes in contact with the glass in said bath and arranged adjacent to the bottom thereof in such position that the top portions of the electrodes will be spaced a substantial distance below the normal level of the surface of the glass of said bath, and means for supplying an alternating electric current to said electrodes to cause a current to pass between said electrodes through the glass in said tank to supply heat thereto generated by the resistance of the molten glass to the passage of current between the electrodes, the last named means being effective to supply current to the electrodes at an intensity so low that arcing between the electrodes and consequent disintegration thereof will be prevented, whereby the heat electrically generated in the bath of glass in a zone spaced materially below the surface thereof will cause convection circulation of the glass in said tank for refining and homogenizing the glass, and whereby the non-arcing character of the electric heat supplying means will positively preclude disintegration of the glass due to overheating thereof or contamination of the glass by products of the disintegration of the electrodes themselves so that clear, colorless glass may be produced.

6. Apparatus for making glass, comprising a tank for containing a bath of molten glass and glass-making materials to be melted and converted into glass, means for supplying combustion generated heat to the glass in said tank for melting the glass-making materials and converting them into glass including means for introducing combustible material into said tank above the normal level of glass therein, a well formed in the bottom of said tank, and spaced electrodes in said well adapted to be submerged by the glass in said tank for passing a current of electricity through the glass in said well and said tank and for thereby creating a convection circulation of the glass in said tank for refining and homogenizing the glass.

7. Apparatus for making glass, comprising a tank for containing a bath of molten glass, means for separating the tank into two main chambers communicating with each other, a passage having an enlarged portion interposed between said chambers through which the glass must pass from one chamber to the other, means for supplying glass-making materials to one of said chambers, and means to pass an electric current through said enlarged portion of said passage for raising the temperature of the glass therein to a temperature above the average temperatures in either of said main chambers, said passage having relatively restricted portions communicating between said enlarged portion and said main chambers for preventing convection currents of hot glass passing back and forth between the high temperature zone in said enlarged portion and the lower temperature zones in said chambers 8. Apparatus for making glass, comprising a tank for containing a bath of molten glass and glass-making materials to be melted and converted into glass, a baffle wall disposed transversely of said tank for dividing the tank into two glass containing chambers, a passage beneath said baffle communicating between said chambers at a level adjacent to the floor of said tank and beneath the normal level of the glass in said chambers, means for generating products of combustion in the first of said chambers to which the glass-making materials are supplied and for thereby supplying heat to the glass and glass-making materials therein, and electrodes located in said first chamber adjacent to said baffle wall for supplying additional heat at this portion of the tank to raise the adjacent glass to a higher temperature than that to which it was raised by the heat supplied by combustion and for thereby assisting in the refining and planing of the glass.

9. Apparatus for making glass, comprising a tank for containing a bath of molten glass and glass-making materials to be melted and converted into glass, means for generating products of combustion in said tank above the normal level of glass therein, electrodes disposed in said tank below the normal level of glass therein so as to be submerged thereby and adapted to pass a current of electricity through the glass for providing additional heat thereto and for raising the temperature of the glass in the tank adjacent to the path of the current between the electrodes to a temperature higher than that to which it was raised by the combustion-supplied heat, and means for shielding the zone of the tank through which the electric current passes from the remainder of the tank at least partially to conserve the electrically generated heat to the portion of the tank to which it is supplied and economize in the use of electric power.

10. Apparatus for making glass, comprising a tank for containing a bath of molten glass and glass-making materials supplied thereto, means for separating the tank into two chambers including a baffle wall extending from above the normal level of the glass in the tank to a level adjacent to the bottom of the tank, a passage communicating between said chambers beneath said baffle wall, means for generating products of combustion in the chamber to which batch is fed and for thereby supplying heat for melting the glass-making materials and converting them into glass and for raising the temperature of the glass so made, spaced electrodes positioned one at either side of the tank adjacent to said baffle wall for passing a current of electricity through the glass in a direction generally parallel to the baffle wall and for thereby supplying additional heat to the glass to create a convection circulation adjacent to the path of the electric current and to raise the temperature of the glass above that to which it was raised by the combustion generated heat, and a shield extending over the zone including the path of the current between said electrodes for preventing direct radiation from the glass in this zone to other portions of the tank.

11. Apparatus for making glass, comprising a tank for containing a bath of molten glass and glass-making materials to be melted and converted into glass, a baffle wall extending transversely of said tank and dividing the space above the normal level of the glass therein into two chambers partially heat separated one from the other and also extending downwardly into the bath of glass from above the normal level thereof to a point adjacent to the level of the bottom of the tank, a passage communicating between said chambers beneath said baffle through which the glass may pass from one to the other of said chambers, means for generating products of combustion in the chamber to which glass-making materials are supplied for supplying heat to melt the glass-making materials and to raise the temperature of the glass thus made to a predetermined temperature, a second baffle wall extending upwardly from the floor of the last-mentioned chamber to a level just below the normal level of the glass therein and parallel to the first-named baffle wall but spaced therefrom to form a compartment communicating with the glass in both chambers, electrodes in said compartment positioned below the normal level of glass in said tank for passing a current of electricity through the glass in said compartment and for thereby creating a convection circulation of the glass and for raising its temperature to a point higher than that to which it was raised by the combustion-supplied heat, and a heat shield extending between the side walls of said tank above said compartment and above the normal level of the glass therein for preventing direct radiation from the high temperature glass in said compartment to other and cooler portions of the tank and thereby for aiding in conserving the electrically supplied heat to said compartment, whereby the tank may be operated with a predetermined rate of heat supply by combustion independently of the pull of glass on the tank and variations in the pull of glass may be compensated for by variation in the amount of heat supplied by the electric current passing between said electrodes.

HAROLD A. WADMAN.